United States Patent

[11] 3,603,824

| [72] | Inventor | Joachim Csaki<br>Stuttgart, Germany |
|---|---|---|
| [21] | Appl. No. | 18,660 |
| [22] | Filed | Mar. 11, 1970 |
| [45] | Patented | Sept. 7, 1971 |
| [73] | Assignee | Ackermann u. Schmitt K.G.<br>Stuttgart, Germany |
| [32] | Priority | Mar. 12, 1969 |
| [33] | | Germany |
| [31] | | P 19 12 535.0 |

[54] WIRING HARNESS FOR ELECTRICAL ROTARY MACHINES
9 Claims, 7 Drawing Figs.

[52] U.S. Cl. .................................................. 310/71,
310/239
[51] Int. Cl. .................................................. H02k 13/00
[50] Field of Search .................................................. 310/71,
241, 238, 233, 234

[56] References Cited
UNITED STATES PATENTS

| 1,240,585 | 9/1917 | Lee | 310/241 |
| 2,947,895 | 8/1960 | Wray | 310/239 |
| 3,277,325 | 10/1966 | Staff | 310/239 |

*Primary Examiner*—D. X. Sliney
*Attorney*—Christen and Sabol

ABSTRACT: A wiring harness for assembling electrical rotary machines having field coils and a rotary armature comprises a plastic spider for positioning a resilient metal clip which connects a field coil with a fixed brush and guides a wire connected with a field coil into alignment with an opening in the housing for the wire.

WIRING HARNESS FOR ELECTRICAL ROTARY MACHINES

The invention relates to a wiring harness to be used for assembling the stator core assembly of electric motors or generators arranged in a housing having a field winding with sliding contact for connecting with the mountings for the brushes or collector contacts.

The invention relates generally to the mounting of electric rotary machines, especially for small electric motors such as hand drills, hand grinders, motor driven hand saws and similar things, and, for one thing, it has for its purpose to make the assembly of such electric motors easier.

In the case of the known electric motors, for example for small electric machines, a stator core assembly carrying a field winding must be inserted in the motor housing, whereby, at the same time, electric contacts or connections must be established between the field winding, on the one hand, the sliding contacts or brushes, and a motor switch or something similar. Since the motor housing, as a rule, encompasses the stator core assembly very closely it is often difficult because of reasons of space to bring the connecting lines of the field winding to the proper spot and there to establish the contact with the assigned parts, for example the holder for the brushes or with a switch, during insertion of the stator core assembly in the motor housing. Besides that, the inside wiring, during this mounting of the motor as well as during the operation of the motor, may assume a position which might endanger the user in the case of damage to the insulation of the wiring.

For that one object of the invention is to eliminate the difficulty described and to provide an arrangement in which a simple, quick and safe connection of the connecting wires of the field winding with other assembly elements of an electric motor is possible, whereby the inside wires are fixed in a position which will satisfy the requirements of electrical safety.

According to the invention, this task is solved through the fact that on the side of the armature assembly facing the sliding contact of the motor, a spider is supported which consists of electrically insulating material and that on said harness contact elements connected with the field winding are arranged which, upon insertion of the armature assembly in the housing, will automatically establish an electrically conductive connection with the holder of the brushes, as well as through the fact that the spider, in addition, has guide elements for the reception and guidance of connecting wires connected with the field winding.

Use of the above mentioned spider achieves, among other things, the advantage that the connecting wires of the field winding will be brought to their prescribed position outside the motor housing so that they can be connected there. In the case of pushing the stator core assembly into the motor housing, an electric connection between the contact elements connected with the field winding and the holder of brushes develops automatically while other connecting wires of the field winding are guided by the spider to the point where they can be connected, for example soldered or clamped on, without any difficulty with further assembly of the parts of the electric motor. A cumbersome and time consuming threading in of the connecting wires of the field winding in the case of attachment of the stator core assembly in the motor housing therefore is not necessary if one uses the invention. Furthermore, because of the guidance of the connecting leads provided for by the invention, the strand wires connected with the field winding, which have been required up to this point because of their flexibility, may be omitted, so that the ends of the field winding, which in most cases consist of a stiff wire, can be connected directly with the pertinent assembly elements of the electric motor, which means a further saving of material and working time.

In the case of a preferred embodiment of the invention, the spider is formed with elastic feet with which it is clamped into the housing assembly. The spider, furthermore, can also be glued to the housing assembly. It is of advantage to form the contact members arranged on the spider resiliently, so that they encompass the holder of the brushes arranged fixedly in the housing during the installation of the core assembly in the housing so that they facilitate the further mounting of the motor.

At least one eye is arranged preferably as a guide element integrally formed in the spider which receives the connecting wires of the field winding, whereby the guide element may also have a lateral introduction slit for the connecting wires, which slit can be flexed elastically. It is, furthermore, favorable if the eye is positioned to penetrate into a recess of the motor housing during assembly of the motor.

Finally, it will be particularly advantageous if the spider proposed in accordance with the invention is formed at the same time to assist a distributor for the cooling airflow of the motor.

The subsequent description of preferred embodiments of the invention serves for a further explanation in connection with the attached drawings.

Figure 1:
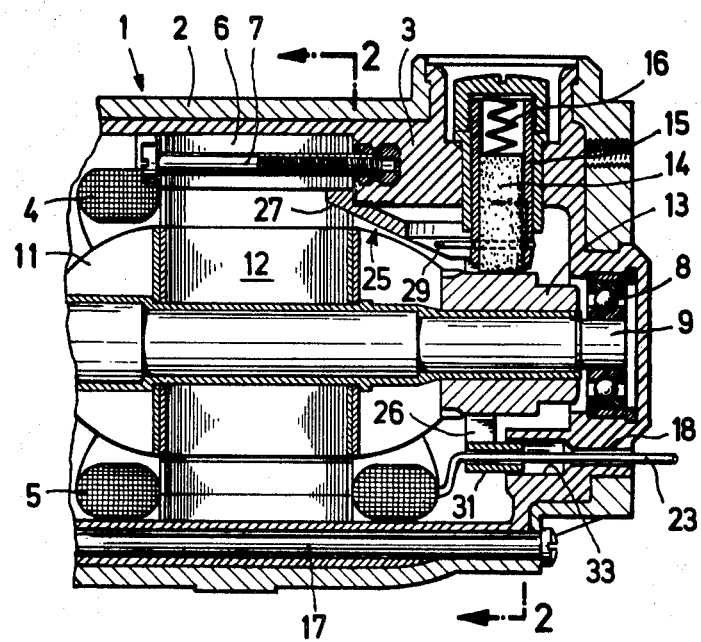
FIG. 1 shows an axial cross section made along the line 1—1 in FIG. 2 of an electric rotary machine according to the invention.
Figure 2:
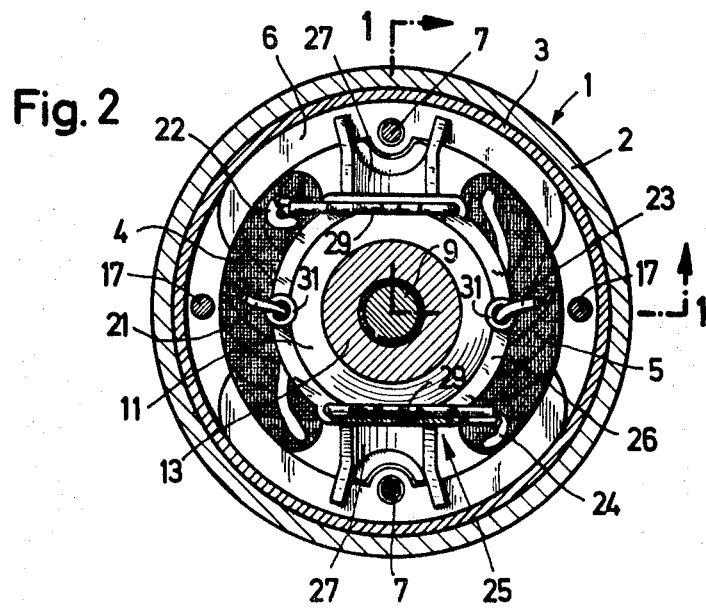
FIG. 2 shows a cross-sectional view of the machine along the line 2—2 in FIG. 1.

In the case of the electric motor shown in FIGS. 1 and 2, a motor housing 1 consists of an outside metallic casing 2 and a plastic lining 3. A stator core assembly 6 bearing two field coils 4 and 5 is inserted in the usual manner in the housing 1 and is held firmly by means of screws 7. Housing 1, furthermore, contains a ball bearing 8 in which the shaft 9 of an armature or rotor 12, provided with a winding 11, is mounted rotatably. Brushes 14 slide on the collector, or commutator 13 of armature 12, which brushes are guided slidably in a holder 15 provided in the housing 1 and are loaded by a spring 16. Instead of the collector 13 and the brushes 14, other sliding contacts too can be provided, for example in the form of slip rings and brushes. The left part of the electric motor, which has been omitted in FIG. 1, comprises a conventional face cap with a bearing (not shown) for reception of the left end of the shaft 9. This face cap is held on the housing by means of long screws 17.

The assembly of the electric motor shown takes place in a known manner in such a way that, first of all, the stator core assembly 6, carrying the coils 4, and 5, are inserted in the housing 1 and, if need be, are attached by means of screws 7. Subsequently, armature 12 is introduced, whereupon the face cap, not shown, is put on with screws 17. Then the brushes 14 can be introduced in the support 15.

The coils 4 and 5 constituting the field winding have connecting ends or connecting wires 21, 22, 23, 24, which, during assembly of the electric motor, must be connected electrically conductively with the support 15 of the brushes 14 as well as with additional assembly elements of the motor, for example a switch or an arrangement connecting with a power supply, whereby these connecting wires, as for example connecting wire 23 in FIG. 1, must be threaded through small openings 18 in the housing 1.

In order to make this work more easy, namely the connection of the connecting wires of the field winding with other assembly elements of the motor and the threading of them through the openings of the housing, a spider 25, consisting of electrically insulating material, preferably plastic, is supported according to the invention on the side of the core assembly 6 facing the collector 13, the shape of which spider can be seen in FIGS. 2–5. The spider 25 comprises a carrier ring 26 which, suspended freely, is connected with the core assembly 6 by way of two feet 27. The connection with the core assembly in this case can take place either by glueing them together or in case of a spider, produced from resilient plastic, through simply snapping it in place, whereby the resilient feet 27 may engage with an edge of the stator core assembly 6 by means of a rectangular notch 28. Resilient electrical contact members 29 made of metal are arranged in the carrier ring 26 at two diametrically opposed places, the geometrical shape of which members can be seen best in FIG. 5. Furthermore, diametrically opposed protruding eyes or casings 31 are provided on the carrier ring 26.

During assembly of the electric motor the described spider 25 is used in the following manner: The spider 25 is attached in the housing on the side of the stator core assembly 6 which faces the collector 13 and prior to its insertion, for example, it is either glued or snapped in place. Now the connecting wires 22 and 24 of coils 4 or 5 are connected, for example soldered, electrically with the resilient contact members 29. Besides the two other free connecting leads 21 and 23 of coils 4 or 5 are pushed through the eyes 31 acting as guide elements, so that these ends are fixed. Now the stator core assembly 6 (in FIG. 1, from the left), which is equipped with spider 25, is introduced in the motor housing 1 in such a way that, on the one hand, the contact members 29 are placed around the supports 15 of the brushes 14 for the purpose of establishing an electrically conductive connection and, on the other hand, that the connecting leads 21, 23, which are guided and held in place by the eyes 31, automatically thread into openings 18 provided on the housing. During the continued pushing in of the core assembly 6, the protruding eyes or casings 31 finally penetrate during this process into corresponding recesses 33 on the housing. In this manner establishment of an electric connection of the wires 22, 24 with the sliding contacts of the motor, as well as a cumbersome threading in by hand of the connecting wires 21, 23 through openings in the motor housing is not required. If, furthermore, the spider 25 is connected sufficiently firmly with the core assembly 6, the contact members 29, encircling the supports 15 of the brushes 14 and the casings or eyes 31 entering the recesses 33 of the housing, will bring about a temporary fixation of the core assembly in the housing, which will make the further assembly, for example the introduction of screws 7, more easy.

Figure 3:
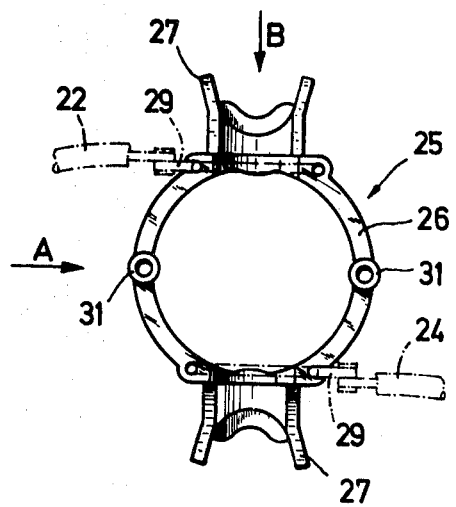
FIG. 3 is an end view of the contact arrangement shown in FIG. 2.
Figure 4:
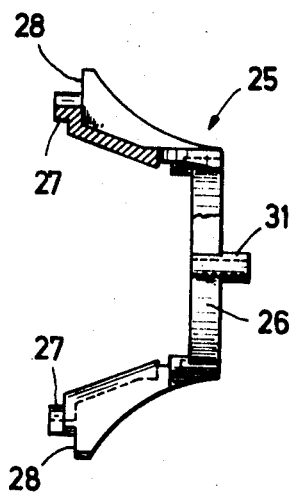
FIG. 4 is a partially cut side view of the contact arrangement in the direction of arrow A in FIG. 3.
Figure 5:
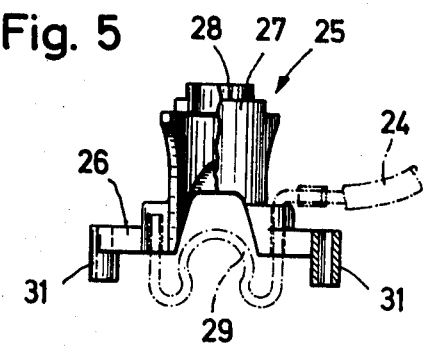
FIG. 5 shows a partially cut plan view of the contact arrangement in the direction of arrow B in FIG. 3.
Figure 6:
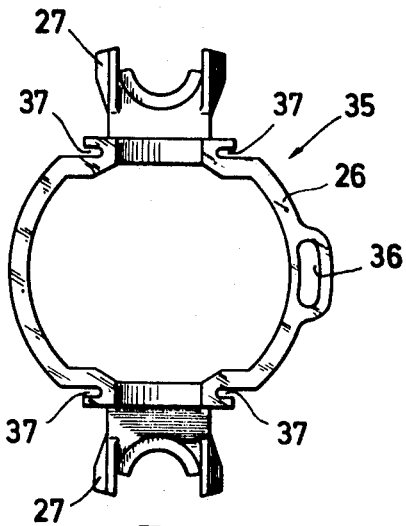
FIG. 6 is an end view of a modified embodiment of a contact arrangement according to the invention and FIG. 7 is a detailed view of a further modified embodiment of a contact arrangement according to the invention.

In FIG. 6 a modified spider 35 is illustrated, which essentially differs from the spider 25 shown in FIGS. 3–5 through the fact that, instead of the two eyes or casings 31, a single elongated recess 36 is provided on the carrier ring 26. Through this single recess 36 are passed the two connecting ends 21, 23 (compare FIG. 2) of the field coils 4, 5 during the assembly of the electric motor, so that upon insertion of the core assembly 6 in the housing 1, they can enter automatically into a single, aligned housing bore which corresponds to the bore 18 in FIG. 1. The spider 35 in FIG. 6 is also provided prior to assembly with resilient contact members which are attached in recess 37 of the carrier ring 26.

Figure 7:
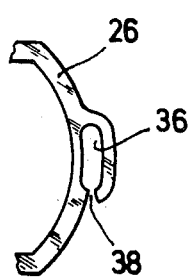

Finally, FIG. 7 show another modification of the spider shown in FIG. 5, which consists in that the recess 36, serving as a guide element for the connecting wires of the field winding, has an insertion slit 38 which can be expanded elastically and into which the connecting wires are pressed laterally. In this manner the introduction of the connecting wires into the recess 36 is made more easily.

The spiders 25, or 35, according to the invention, in their assembled state, are located at the place of the motor housing 1 where customarily ventilation slits or similar openings are arranged, through which cooling air is introduced while armature 12 revolves. According to the invention it is, furthermore, possible to provide for forming the spiders 25 or 35, especially carrier ring 26 or the feet 27, in such a way that the spider will act as a distributor for the cooling air flow and direct this flow to where particularly high heating occurs in the motor. Since the spiders 25, 35 preferably are produced as injection molded or compression molded plastic parts, it is possible quite easily to attach corresponding guide elements to them.

Other modifications and improvements may also be made in the invention, which would come within the scope of the annexed claims.

1. In wiring harnesses for electrical rotary machines of the type having a housing for supporting fixed coil means, rotary armature means including collector means, fixed brush means for electrical contact with said collector means, and nonmetallic spider means to be mounted in said housing adjacent said brush means, said housing comprising a generally elongated hollow structure having a transverse wall provided with an opening for a field coil lead and bearing means at one end to support one end of the armature means, the other end thereof having closure means to permit insertion of the armature means and said spider means, the brush means including at least one exposed metallic surface, means for positioning said spider means in the housing, said spider means including at least one resilient metallic element for permanent electrical connection with a winding of a field coil means and for resilient electrical contact with said exposed metallic surface of the fixed brush means when positioned in the housing, said spider means also including an eye portion extending in a longitudinal direction disposed in alignment with said opening in the transverse wall for receiving and guiding a field coil lead into said opening.

2. The invention defined in claim 1, wherein said spider means includes outwardly projecting resilient mounting feet.

3. The invention defined in claim 1, wherein said fixed coil means includes an inner core assembly, and said spider means includes a surface for complementary engagement with a portion of the core assembly for adhesive attachment thereto.

4. The invention defined in claim 1, wherein said exposed metallic surface comprises a transversely arranged tubular brush holder, and said resilient metallic element includes a generally U-shaped portion arranged to partially encircle said tubular brush holder.

5. The invention defined in claim 3, wherein said spider means includes a ring-shaped portion provided with at least two radially outwardly projecting portions for positioning the spider means on said stator core assembly, said ring-shaped portion being provided with a plurality of recesses for attaching said resilient metallic element to the spider means.

6. The invention defined in claim 1, wherein said eye portion is elongated in cross section.

7. The invention defined in claim 1, wherein said eye is slit to enable a lead to be inserted therein by deformation of the eye at said slit.

8. The invention defined in claim 1, wherein said spider means includes a transversely disposed surface, and said eye portion includes a tubular portion projecting from said transverse surface for engagement with said opening in the housing.

9. The invention defined in claim 1, wherein said spider means also includes means for assisting in the distribution of cooling air through a rotary electric machine.